United States Patent
Parikh et al.

(10) Patent No.: US 9,948,693 B2
(45) Date of Patent: Apr. 17, 2018

(54) GENERIC CLOUD SERVICE FOR PUBLISHING DATA TO BE CONSUMED BY RSS READERS

(71) Applicant: CA, Inc., Islandia, NY (US)

(72) Inventors: Prashant Parikh, Holtsville, NY (US); Craig Vosburgh, Colorado Springs, CO (US); Don Kleinschnitz, Sandy, UT (US)

(73) Assignee: CA, Inc., New York, NY (US)

( * ) Notice: Subject to any disclaimer, the term of this patent is extended or adjusted under 35 U.S.C. 154(b) by 177 days.

(21) Appl. No.: 14/187,835

(22) Filed: Feb. 24, 2014

(65) Prior Publication Data

US 2015/0244763 A1 Aug. 27, 2015

(51) Int. Cl.
| | |
|---|---|
| *H04W 4/26* | (2009.01) |
| *H04W 8/18* | (2009.01) |
| *H04W 24/04* | (2009.01) |
| *H04W 24/10* | (2009.01) |
| *H04W 28/00* | (2009.01) |
| *H04W 68/00* | (2009.01) |

(Continued)

(52) U.S. Cl.
CPC ............ *H04L 67/02* (2013.01); *G06F 3/0482* (2013.01); *G06F 11/3476* (2013.01); *G06F 17/211* (2013.01); *G06F 17/212* (2013.01); *G06F 17/30893* (2013.01); *G06Q 10/06* (2013.01); *G06Q 10/0833* (2013.01); *G06Q 30/0633* (2013.01); *H04L 67/10* (2013.01); *G06F 17/30386* (2013.01)

(58) Field of Classification Search
CPC ..... G06F 17/2247; G06F 17/24; G06F 17/211

USPC .......................................................... 715/234
See application file for complete search history.

(56) References Cited

U.S. PATENT DOCUMENTS

| | | | | |
|---|---|---|---|---|
| 7,853,655 | B2 | 12/2010 | Nussey | |
| 7,860,898 | B1 * | 12/2010 | Moranta | ............. G06F 17/3089 |
| | | | | 707/640 |

(Continued)

OTHER PUBLICATIONS

"WebSitePulse Adds RSS Feed Capabilities and Hourly Data to Its Performance Tracking Reports," www.WebSitePulse.com, Feb. 14, 2006, 2 pages.

(Continued)

*Primary Examiner* — Cesar Paula
*Assistant Examiner* — Luu-Phuong Nguyen
(74) *Attorney, Agent, or Firm* — Vierra Magen Marcus LLP

(57) ABSTRACT

Data from applications is published using a web feed document such as according to the Really Simple Syndication (RSS) protocol. The applications can be information technology (IT) services, such as an Application Performance Management program and a Service Desk program, which are used by an organization. The data is received at an Application Programming Interface (API) and stored in a database in a format which is usable by the web feed document. For example, the data can provide a parameter name, parameter label, severity and user type which are associated with placeholder elements in the web feed document. The user type may be used to restrict the publishing of certain parameters to certain users based on their business roles in an organization. The feed server may provide additional details in response to the user selecting a hyperlink in the web feed document.

13 Claims, 15 Drawing Sheets

(51) Int. Cl.
*H04N 21/2668* (2011.01)
*H04L 29/08* (2006.01)
*G06F 17/30* (2006.01)
*G06F 17/21* (2006.01)
*G06Q 30/06* (2012.01)
*G06Q 10/08* (2012.01)
*G06F 11/34* (2006.01)
*G06F 3/0482* (2013.01)
*G06Q 10/06* (2012.01)

(56) References Cited

U.S. PATENT DOCUMENTS

| | | | |
|---|---|---|---|
| 7,890,814 B2 | 2/2011 | Zhang et al. | |
| 2004/0078722 A1* | 4/2004 | Pfeiffer | G06F 11/3006 |
| | | | 714/47.2 |
| 2004/0148375 A1* | 7/2004 | Levett | G06F 9/46 |
| | | | 709/223 |
| 2006/0173985 A1* | 8/2006 | Moore | G06F 17/3089 |
| | | | 709/223 |
| 2006/0265489 A1* | 11/2006 | Moore | H04L 67/1095 |
| | | | 709/223 |
| 2006/0265508 A1* | 11/2006 | Angel | H04L 29/12047 |
| | | | 709/230 |
| 2007/0083813 A1* | 4/2007 | Lui | G06F 11/3612 |
| | | | 715/709 |
| 2007/0094365 A1 | 4/2007 | Nussey et al. | |
| 2007/0100959 A1 | 5/2007 | Eichstaedt et al. | |
| 2007/0124285 A1* | 5/2007 | Wright | G06F 17/30489 |
| 2007/0156809 A1 | 7/2007 | Dickinson et al. | |
| 2009/0080013 A1* | 3/2009 | Sato | H04N 1/00204 |
| | | | 358/1.15 |
| 2009/0119268 A1* | 5/2009 | Bandaru | G06F 17/2745 |
| | | | 705/7.12 |
| 2009/0210360 A1* | 8/2009 | Sankar | G06F 9/44505 |
| | | | 706/10 |
| 2010/0070448 A1* | 3/2010 | Omoigui | H01L 27/1463 |
| | | | 706/47 |
| 2010/0262901 A1* | 10/2010 | DiSalvo | G06Q 40/04 |
| | | | 715/227 |
| 2010/0268546 A1* | 10/2010 | Reihl | G06Q 30/02 |
| | | | 705/2 |
| 2011/0029853 A1 | 2/2011 | Garrity et al. | |
| 2012/0017127 A1* | 1/2012 | Nagai | G06F 11/0727 |
| | | | 714/57 |
| 2012/0197981 A1* | 8/2012 | Chan | G06Q 30/0276 |
| | | | 709/203 |
| 2013/0124807 A1* | 5/2013 | Nielsen | G06F 11/1438 |
| | | | 711/162 |
| 2014/0279826 A1* | 9/2014 | Dave | G06F 17/30563 |
| | | | 707/602 |

OTHER PUBLICATIONS

"LANDesk Service Desk RSS Generator," LANDesk Software, Document No. LDSD\027, Issue 1.2, Mar. 19, 2013, 12 pages.

\* cited by examiner

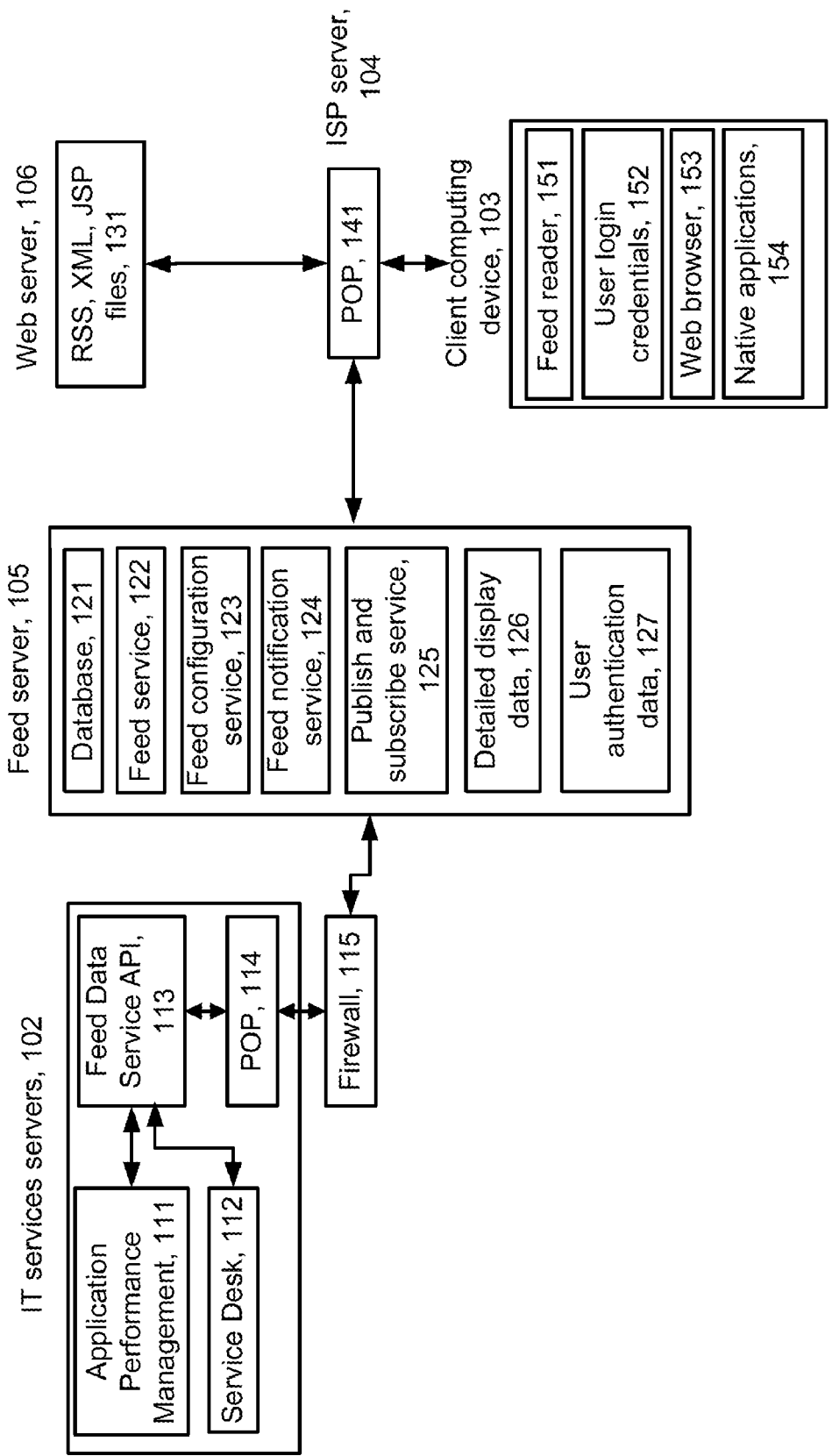

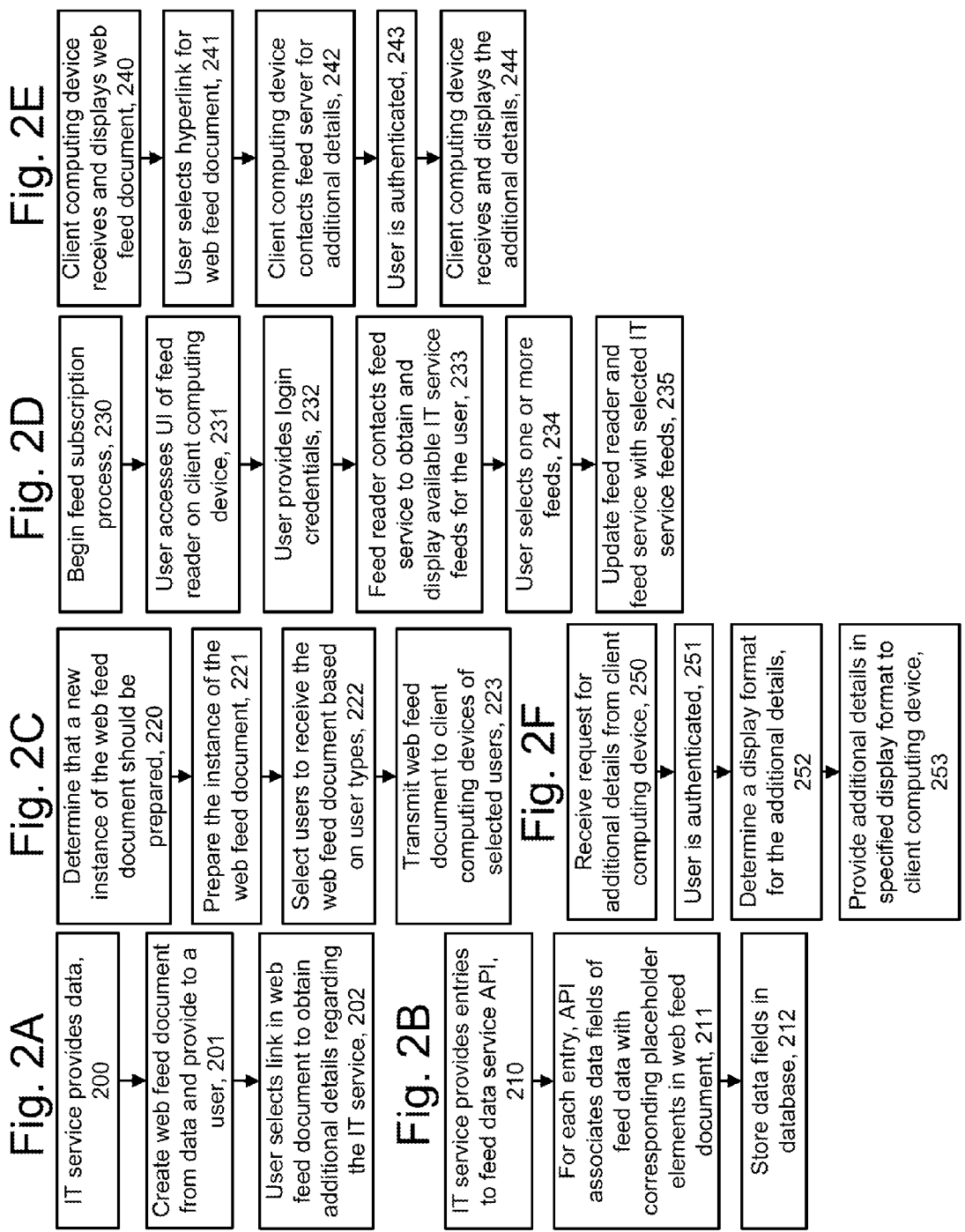

| PARNAME: | PARLABEL: | DISPLAYFORMAT: | SEVERITY: | USERTYPE: |
|---|---|---|---|---|
| CPU5M | %CPU usage (5 min.) | DF_L1H | CPU5MSEV | CPU5MUT |
| CPU1H | %CPU usage (1 hour) | DF_BC8H | CPU1HSEV | CPU1HUT |
| RESPT5M | Response time (5 min.) | DF_LG1H | RESPT5MSEV | RESPT5MUT |

| APPNAME: | APPLABEL: |
|---|---|
| APP1_ID | Application Performance Management |

| TIMENAME: |
|---|
| TS_A1 |

| TS_A1 | CPU5M | CPU5MSEV | CPU5MUT | CPU1H | CPU1HSEV | CPU1HUT |
|---|---|---|---|---|---|---|
| 12:00 GMT | 12 | 0 | 0 | 11 | 0 | 2 ← 301 |
| 12:05 GMT | 10 | 0 | 0 | | | ← 302 |
| 12:10 GMT | 25 | 1 | 1 | | | ← 303 |
| ... | | | | | | |
| 13:00 GMT | 8 | 0 | 0 | 10 | 0 | 2 ← 304 |

| | RESPT5M | RESPT5MSEV | RESPT5MUT |
|---|---|---|---|
| | 2.2 | 0 | 0 ← 301a |
| | 2.0 | 0 | 0 ← 302a |
| | 5.6 | 1 | 0 ← 303a |
| ... | | | |
| | 2.5 | 0 | 0 ← 304a |

| SEVERITY: | SEVERITYLABEL: |
|---|---|
| 0 | normal |
| 1 | high |
| 2 | very high |

| USERTYPE: | UTLABEL: |
|---|---|
| 0 | any |
| 1 | technician |
| 2 | manager |

| USERNAME: | PASSWORD: | USERTYPE: |
|---|---|---|
| jsmith | -- | 1 |
| slee | -- | 2 |

```
RSS document for Application Performance Management (technician)
<rss>
<channel>
<title>Data from Application Performance Management</title>
<link>www.ITservices.com/APP1_ID</link>
<description>This is a feed from APM for the technician</description>

Item for CPU5M:
<item>
<title>VALUE(PARNAME)"@" VALUE(TIMENAME) SEVERITYLABEL </title>
<link>www.ITservices.com/APP1_ID/CPU5M</link>
<description>This is the %CPU usage over 5 minutes averaged</description>
</item>

Item for RESPT5M:
<item>
<title>VALUE(PARNAME)"@" VALUE(TIMENAME) SEVERITYLABEL </title>
<link>www.ITservices.com/APP1_ID/RESPT5M</link>
<description>This is the response time over 5 minutes averaged</description>
</item>

</channel>
</rss>
```

Example RSS message for Application Performance Management, for the technician
Data from Application Performance Management
This is a feed from APM for the technician ← 511

12 @ 06/07/14 12:00 GMT normal ← 512
This is the %CPU usage over 5 minutes averaged 2.2 @ 06/07/14 12:00 GMT normal ← 513
This is the response time over 5 minutes averaged

```
RSS document – generic

<rss>
<channel>
<title>Data from APPLABEL</title>
<link>www.ITservices.com/APPNAME</link>
<description>This is a feed from APPLABEL"</description>

<item>
<title>VALUE(PARNAME)"@" VALUE(TIMENAME) SEVERITYLABEL</title>
<link>www.ITservices.com/APPNAME/PARNAME</link>
<description>This is the PARLABEL</description>
</item>

</channel>
</rss>
```

Example RSS message, generic, for APPLABEL=Application Performance Management and PARNAME=CPU5M Data from Application Performance Management
This is a feed from Application Performance Management ← 531

12 @ 06/07/14 12:00 GMT normal ← 532
This is the %CPU usage (5 min.)

Links which include display format

<link>www.ITservices.com/APP1_ID/CPU5M/DF_L5M</link> ← 540
<link>www.ITservices.com/APP1_ID/CPU5M/DF_L1H</link> ← 541
<link>www.ITservices.com/?app=APPNAME&par=PARNAME&display=DISPLAYFORMAT</link> ← 542

Fig. 6A

```
RSS document for Application Performance Management (manager)
<rss>
<channel>
<title>Data from Application Performance Management</title>
<link>www.ITservices.com/APP1_ID</link>           601
<description>This is a feed from APM for the manager</description>

Item for CPU1H:
<item>
<title>VALUE(PARNAME)"@" VALUE(TIMENAME) SEVERITYLABEL</title>
<link>www.ITservices.com/APP1_ID/CPU1H</link>           602
<description>This is the %CPU usage over 1 hour averaged</description>
</item>
</channel>       603
</rss>
```

Fig. 6B

Example RSS message for Application Performance Management, for the manager

Data from Application Performance Management
This is a feed from APM for the manager          ← 611

11 @ 06/07/14 12:00 GMT normal          ← 612
This is the %CPU usage over 1 hour averaged

Fig. 7A

| PARNAME: | SUBPARNAME: | PARLABEL: | | DISPLAYFORMAT: | SEVERITY: | USERTYPE: |
|---|---|---|---|---|---|---|
| SR10M | | #service requests (10 min.) | | DF_BC1H | SR10MSEV | SR10MUT |
| | PWRST | Password reset | | DF_PC | | |
| | SLRSP | Slow response | | DF_PC | | |
| | OTHER | Other reason | | DF_PC | | |

| TIMENAME: | | APPNAME: | APPLABEL: | | | |
|---|---|---|---|---|---|---|
| TS_A2 | | APP2_ID | Service Desk | | | |

| TS_A2: | SR10M | SR10MSEV | SR10MUT | PWRST | SLRSP | OTHER |
|---|---|---|---|---|---|---|
| 12:00 GMT | 102 | 0 | 0 | 42 | 13 | 47 ← 701 |
| 12:10 GMT | 106 | 0 | 1 | 51 | 19 | 36 ← 702 |
| 12:20 GMT | 153 | 0 | 0 | 48 | 45 | 45 ← 703 |
| ... | | | | | | |
| 13:00 GMT | 110 | | | 50 | 20 | 40 ← 704 |

700

RSS document for Service Desk ← 710
<rss>
<channel>
<title>Data from Service Desk</title>
<link>www.ITservices.com/ServiceDesk</link>
<description>This is a feed from Service Desk</description>

Item for SR10M:
<item>
<title>VALUE(PARNAME)"@" VALUE(TIMENAME) SEVERITYLABEL</title> ⎫
<link>www.ITservices.com/ServiceDesk/SR10M</link>                ⎬ 711
<description>This is the number of service requests over 10 minutes averaged</description> ⎭
</item>

</channel> ⎫ 713
</rss>    ⎭

Example RSS message for Service Desk ← 720
Data from Service Desk
This is a feed from Service Desk   ← 721

102 @ 06/07/14 12:00 GMT normal                                       ← 722
This is the number of service requests over 10 minutes averaged

Fig. 7C

Options for links
<link>www.ITservices.com/ServiceDesk/SR10M?subpar=PWRST&subpar=SLRSP&subpar=OTHER</link>   ← 730
<link>www.ITservices.com/   ← 731
?app=APPNAME&par=PARNAME&subpar=SUBPARNAME1&subpar=SUBPARNAME2&subpar=SUBPARNAME3</link>

Fig. 7D

GENERIC CLOUD SERVICE FOR PUBLISHING DATA TO BE CONSUMED BY RSS READERS

BACKGROUND

The growing presence of the Internet as well as other computer networks such as intranets and extranets has brought many new applications in e-commerce, education and other areas. Information Technology (IT) services are used to support the delivery of such applications to end users. Organizations increasingly rely on such applications and services to carry out their business or other objectives. Data regarding the status of such applications and services is useful for various personnel in the organization.

BRIEF SUMMARY

A system and method are disclosed for communicating data from an IT service to a user as a web feed document. Periodically-updated data from one or more IT services can be obtained and stored in a format which is compatible with a web feed document. The web feed document can comprises an extensible markup language (XML) document in a Really Simple Syndication (RSS) format, for instance. This approach provides the web feed document in a common format even when data is received from the IT services in different formats. Further, the web feed document can provide a link to additional details of an IT service to allow further analysis by a user with the required credentials.

In one aspect, a method comprises obtaining periodically-updated data from a first information technology service. The IT service can comprise an application performance management or a service desk application, for instance. The periodically-updated data comprises successive entries which indicate a time-varying performance of the first information technology service, and each entry comprises a plurality of data fields. For example, the data fields can include a time stamp, a name, label and numerical data value of a parameter, and a severity level associated with the parameter. For each entry, the method includes storing the plurality of data fields in a format which is compatible with a web feed document such as in the RSS format. The web feed document comprises a plurality of placeholder elements, and the storing comprises associating each data field of the plurality of data fields with a corresponding placeholder element.

BRIEF DESCRIPTION OF THE DRAWINGS

Aspects of the present disclosure are illustrated by way of example and are not limited by the accompanying figures with like references indicating like elements.

FIG. 1B further details of the computing system of FIG. 1A.

FIG. 2A depicts a flowchart of an overview of a process in which periodically-updated data is obtained from an IT service and provided to a user in a web feed document.

FIG. 2B depicts a flowchart of further details of step 200 of FIG. 2A in which an IT service provides periodically-updated data.

FIG. 2C depicts a flowchart of further details of step 201 of FIG. 2A in which a web feed document is transmitted to a user.

FIG. 2D depicts a flowchart of a subscription process for the process of FIG. 2A.

FIG. 2E depicts a flowchart of further details of step 201 of FIG. 2A in which a web feed document is received by a user.

FIG. 2F depicts a flowchart of further details of step 202 of FIG. 2A in which a user obtains additional details regarding a parameter of an IT service.

FIG. 3 depicts a data structure in which data fields from an IT service are stored, for an application called Application Performance Management, consistent with FIG. 2B.

FIG. 4A depicts a data structure which associates a severity level with a label, consistent with FIG. 2B.

FIG. 4B depicts a data structure which associates a user type with a label, consistent with FIG. 2B.

FIG. 4C depicts a data structure for user credentials, consistent with FIG. 2D.

FIG. 5A depicts an example web feed document for Application Performance Management, for a user type of technician, consistent with FIG. 3.

FIG. 5B depicts the example web feed document of FIG. 5A as displayed by a feed reader.

FIG. 5C depicts an example generic web feed document.

FIG. 5D depicts the example web feed document of FIG. 5C as displayed by a feed reader.

FIG. 5E depicts alternative links for use in a web feed document, where the links specify a display format.

FIG. 6A depicts an example web feed document for Application Performance Management, for a user type of manager, consistent with FIG. 3.

FIG. 6B depicts the example web feed document of FIG. 6A as displayed by a feed reader as displayed by a feed reader.

FIG. 7A depicts a data structure in which data fields from an IT service are stored, for an application called Service Desk, consistent with FIG. 2B.

FIG. 7B depicts an example web feed document for Service Desk, consistent with FIG. 7A.

FIG. 7C depicts the example web feed document of FIG. 7B as displayed by a feed reader.

FIG. 7D depicts alternative links for use in a web feed document, where the links specify subparameters of a parameter.

DETAILED DESCRIPTION

Figure 1A:
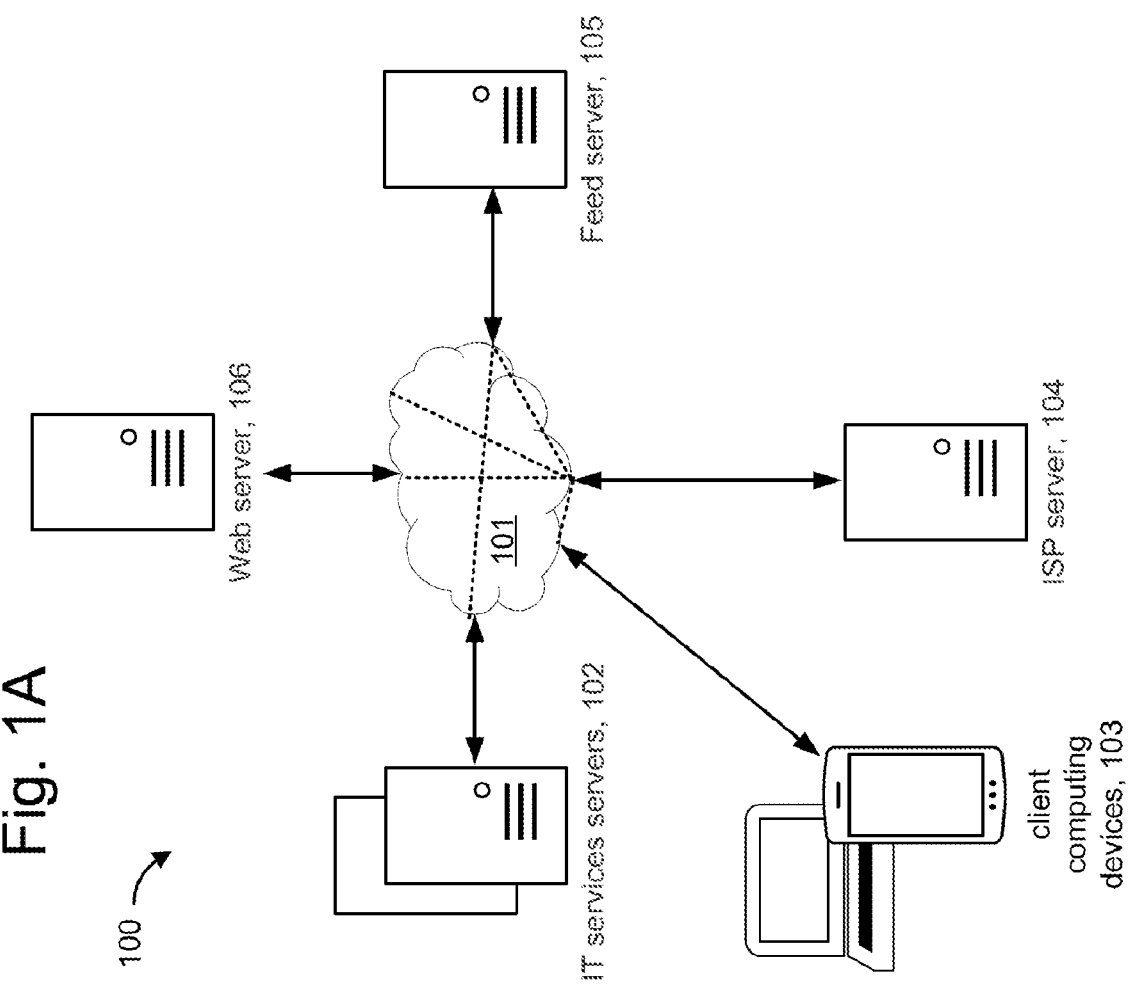
FIG. 1A depicts an example computing system in which periodically-updated data is obtained from IT services and provided to users in web feed documents.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or by combining software and hardware implementations that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

As mentioned at the outset, various challenges are encountered in presenting information from Information Technology (IT) services. Such services are used to support the delivery of applications to end users, sometimes referred to as customers. One example of an IT service, which itself is also an application, is an Application Performance Management (APM) application which monitors instrumented components of an application. In this case, a thread or process of the monitored application can be traced to identify each component that is invoked, as well as to obtain runtime data such as the execution time of each component. Personnel that are responsible for the APM application may be interested in knowing, e.g., the level of various performance metrics and when such metrics are abnormal.

Another example of an IT service is a Service Desk application which is used to track problems which are experienced by software users. For example, a user may contact a help desk operator with a problem or submit a help request electronically. A service ticket is issued which tracks the request until it is resolved. For example, users often need help with tasks such as resetting a password, using peripherals such as printers, using software and computing devices, and updating and installing software. Personnel that are responsible for the Service Desk application may be interested in knowing, e.g., the number of requests which are currently pending and how long it takes to close each service ticket.

Many other example are possible. Generally, IT services support the use of computers and telecommunications equipment (e.g., televisions and telephones) to store, retrieve, transmit and manipulate data, often in the context of a business or other enterprise. IT services can support the use of computer hardware, software, electronics, semiconductors, internet, telecom equipment, e-commerce and computer services.

While IT services are mentioned as a specific implementation, the techniques provided herein are applicable to providing any periodically-updated data from one or more applications of any type to one or more users.

Moreover, a company may have many IT services running and various types of personnel (users) who are interested in the IT services. It would be convenient for these users to be able to monitor IT service data using generic computing devices such as mobile devices (e.g., smart phones, tablets, laptops, head-mounted displays), PCs or other computing devices. One approach is to configure the computing device with a custom standalone application which communicates with a custom back office infrastructure for the IT service. However, this introduces complexity and higher costs. Moreover, in the cases of multiple IT services, the complexity is multiplied. For example, if a company has seven IT services, there could be seven applications for a user's computing device and seven back office infrastructures. These approaches are expensive and difficult to maintain.

Techniques provided herein make it easier and less expensive to provide data from one or more IT services to a computing device. The techniques also make it easier for the end user to view data from the IT services with other, unrelated information on a common screen. The user can therefore easily monitor the IT services while using their computing devices for other purposes.

The techniques provided herein use a web feed document to publish IT services data. Generally, web feed formats such as RSS and ATOM are used for publishing syndicated content on the web. Web feed documents are recognized and supported by most web browsers and by dedicated web feed readers, also referred to as news/information aggregators. End users subscribe to a feed in their browser or reader to receive the feeds at various times. RSS was originally referred to as Rich Site Summary and later as Really Simple Syndication. RSS provides a family of standard web feed formats to publish frequently updated information such as blog entries, news headlines, audio and video. A web feed document (also called a feed, web feed, newsfeed or channel) can include full or summarized text, and metadata, such as the publishing date and the author's name. RSS feeds enable publishers to syndicate data automatically. A standard XML file format ensures compatibility with many different machines/programs. RSS feeds also benefit users who want to receive timely updates from favorite websites or to aggregate data from many sites. Once users subscribe to a website, their browser or reader periodically monitors the site and informs the user of any updates. Or, the browser or reader can also be commanded to automatically download the updates.

FIG. 1A depicts an example computing system in which periodically-updated data is obtained from IT services and provided to users in web feed documents. The computing system 100 includes a network communication medium 101, IT services servers 102, client computing devices 103, an Internet Service Provider (ISP) server 104, a feed server 105 and a web server 106. The dotted lines in the network communication medium indicate connections between the servers. The servers 104 and 105 can also be web servers. The IT services servers are computing devices on which software of the IT services runs. The client computing devices can be a personal computer (PC) such as a desktop or laptop computer, a personal digital assistant, a cellular telephone such as a smart phone, a tablet, or other known computing device. The ISP server is used by the client computing devices to access the network communication medium, e.g., the Internet. The feed server receives data from the IT services servers and uses it to provide updates to the client computing devices in the form of web feed documents. The feed server can also provide additional details regarding the IT services to the client computing devices upon request by the users of the devices. The web server can provide other information, e.g., unrelated to the IT service data, which is used by the client computing devices. Generally, the functions of the various servers can be performed in one or more servers.

FIG. 1B further details of the computing system of FIG. 1A. The IT services servers include software 111 of an Application Performance Management application and software 112 of a Service Desk application, as example first and second IT services, respectively. One or more IT services may be used. The IT services provide data to a Feed Data Service Application Programming Interface (API) 113, which communicates with a Point of Presence (POP) component 114. The POP component communicates via a firewall 115 with the feed server 105. The feed server is depicted as having a number of components which can be provided on one or more servers. These components include a database 121, a feed service 122, a feed configuration service 123, a feed notification service 124, a publish and subscribe service 125, detailed display data 126 and user authentication data 127.

Using a POP 141 of the ISP server 104, the client computing device 103 communicates with the feed server 105 and the web server 106. The web server may provide data in the form of RSS, XML and Java Server Page (JSP) files, for example. In one approach, the RSS files are not related to the IT service data but can be received by the same feed reader of the client computing device which receives RSS files which comprise the IT service data. The client computing device 103 includes a feed reader 151, user login credentials 152, a web browser 153 and native applications 154.

In one approach, the IT services servers are located at the premises of an organization which deploys the IT services (e.g., applications) and the other components are off-premises. The Feed Data Service API provides data in different formats from different IT services to the feed server in a uniform format which can be used to create web feed documents. The API updates the database 121 based on each data feed it receives. The API can also provide security details indicating which users can access the data, e.g., based on a user type data field.

The feed server 105 can be considered to be part of a content delivery network or a cloud service or computing platform, for instance. The feed server provides a set of web services for transmitting the data stored in the database to one or more client computing devices. The data is provided as part of a web feed document, also referred to as a news feed so that the client computing devices can display it using an existing feed reader. As a result, the user can easily view the IT data along with any other data they normally desire to read about. The user can therefore easily monitor the status of the IT applications and be alerted of conditions which require attention.

In the feed server 105, the feed service 122 can transmit feeds to the client computing devices, e.g., when new entries are received in the database, at another time set by the feed server or IT service, or in response to a request from a client computing device. The feed service 122 can use a ROME API, for instance, as a core to create and manage web feeds such as RSS feeds. Additional details regarding a feed can be created via a link in the feeds and use RESTAPI and JSP to output the details as an HTML file, for instance. Rome API is an open source Java API for reading and publishing RSS feeds in a relatively format-neutral way. JavaServer Pages (JSP) is a technology that helps software developers create dynamically generated web pages based on HTML, XML, or other documents.

REST API is the Representational State Transfer Application Programming Interface. REST is an architectural style that abstracts architectural elements within a distributed hypermedia system. A web API can be implemented using HTTP and REST principles. Such an API comprises four aspects. A first aspect is the base URL for the web API, such as http://example.com/resources/. A second aspect is the Internet media type of the data supported by the web API. This can be any valid Internet media type such as JSON. JSON, or JavaScript Object Notation, is an open standard format that uses human-readable text to transmit data objects consisting of attribute-value pairs. A third aspect is the set of operations supported by the web API using HTTP methods (e.g., GET, PUT, POST, or DELETE). A fourth aspect is that the API is hypertext driven.

The feed configuration service 123 can perform create, read, update and delete (CRUD) operations on feeds to be published.

Optionally, the feed notification service 124 can transmit an email to a client computing device with the information of the web feed document.

The publish and subscribe service 125 can use a publish and subscribe messaging protocol to manage the publishing and subscription processes.

The detailed display data 126 represents additional details which can be provided to a client computing device in response to a user selection of a link in a web feed document.

The user authentication data 127 can include user login credentials which are verified before providing the detailed display data.

In the approach herein, since the API provides the data from different IT services in a common format for use in a web feed document, the system can easily accommodate changes in the formats of the IT services and the addition of data from new IT services. For instance, an IT service may decide to monitor a new parameter or change the name of a parameter. The IT service provider may also decide to change the display format of a parameter. The API can be updated to accommodate these changes so no burden is imposed on the IT service provider.

Note that the publication of data from IT service is an example only. Other types of data can be published as well.

Figure 1C:
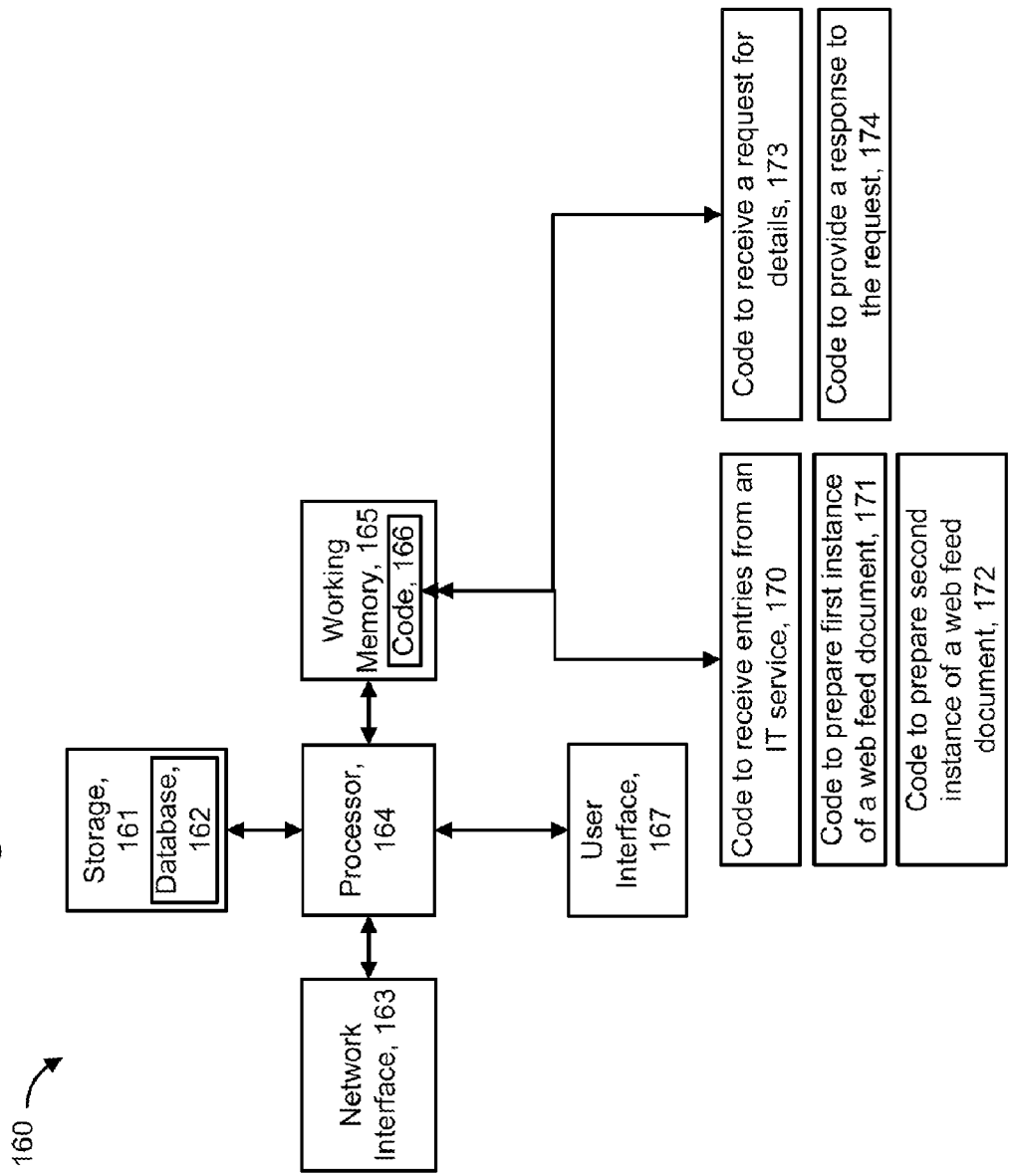
FIG. 1C depicts an example computing device which represents any of the computing devices in FIG. 1A.

FIG. 1C depicts an example computing device which represents any of the computing devices in FIG. 1A. The computing device 160 is a simplified representation of a system which can represent any client computing device or server, for instance. The computing device includes a storage device 161, a network interface 163 for communicating with other computing devices, a processor 164 for executing code (e.g., software instructions/modules), a working memory 165 such as RAM for storing the code 166 after it is loaded from the storage device, for instance, and a user interface 167.

As an example, when the computing device represents the feed server, the code 166 may include computer readable program code 170 configured to receive entries from an information technology service, computer readable program code 171 configured to prepare a first instance of a web feed document from the entries, and computer readable program code 172 configured to prepare a second instance of the web feed document from the entries.

The storage device 161 or working memory 165 may be considered to be a tangible, non-transitory processor- or computer-readable storage device, apparatus, memory or product, excluding a propagating signal, having processor readable code embodied thereon for programming the processor 164 to perform methods for providing the functionality discussed herein.

A database 162 can be provided in the storage device. The user interface 167 can include a display to provide information to a human user, and an input device such as a keyboard, mouse or other pointing device, or voice command module, for receiving inputs/commands from a human user. The database 162 can include information such as entries comprising data fields.

FIG. 2A depicts a flowchart of an overview of a process in which periodically-updated data is obtained from an IT service and provided to a user in a web feed document. At step 200, one or more IT services provide respective periodically-updated data. For instance, this can be in XML files. The data can be updated on a fixed or varying periodic basis and indicates a time-varying performance of the IT service. At step 201, a web feed document is created from the periodically-updated data and provided to a user. At step 202, a user selects a link in the web feed document to obtain additional details regarding the IT service.

FIG. 2B depicts a flowchart of further details of step 200 of FIG. 2A in which an IT service provides periodically-updated data. At step 210, an IT service provides entries to the feed data service API. At step 211, for each entry, the API associates data fields of the feed data with corresponding placeholder elements in a web feed document. Step 212 stores the data fields in the database. See FIGS. 3 and 7A for example database formats.

FIG. 2C depicts a flowchart of further details of step 201 of FIG. 2A in which a web feed document is transmitted to a user. Step 220 determines that a new instance of a web feed document should be prepared. The web feed document can be transmitted according to a schedule set by the feed server or the IT services, for instance. In one approach, a web feed document is transmitted as soon as new IT service data is received. In another approach, multiple entries are saved up and transmitted in a group. In another approach, a web feed document is transmitted on an urgent basis based on the severity level. For example, the severity level being high or very high may indicate the presence of an urgent problem. Step 221 prepares the new instance of the web feed document. Step 222 optionally selects users to receive the web feed document based on user types. Step 223 transmits the web feed document to client computing devices of the selected users.

FIG. 2D depicts a flowchart of a subscription process for the process of FIG. 2A. Step 230 begins a feed subscription process. At step 231, the user accesses a user interface (UI) of the feed reader on the client computing device. See FIG. 8A. At step 232, the user provides login credentials, e.g., a user name and password. At step 233, the feed reader contacts the feed service to obtain and display available IT service feeds for the user. At step 234, the user selects one or more feeds to which the user desires to have a subscription. Step 235 updates the feed reader and the feed service with the selected IT service feeds.

FIG. 2E depicts a flowchart of further details of step 201 of FIG. 2A in which a web feed document is received by a user. At step 240, the client computing device receives and displays the web feed document. See FIGS. 5B, 5D, 6B, 7C, 8B and 8C. At step 241, the user selects a hyperlink for the web feed document. At step 242, the client computing device contacts the feed server or another web server to obtain additional details. At step 243, the user is authenticated to the server. For example, the user may provide login credentials. In one approach, the user types in the login credentials when the additional details are requested. In another approach, the login credentials are included automatically with the request. In another approach, the request is made in a secure session established between the client computing device and the feed server. This allows the detailed data to be provided securely, even as RSS does not include authentication. At step 244, the client computing device receives and displays the additional details. See FIGS. 8D-8G.

FIG. 2F depicts a flowchart of further details of step 202 of FIG. 2A in which a user obtains additional details regarding a parameter of an IT service. At step 250, a server receives a request for additional details from a client computing device. At step 251, the user is authenticated, similar to step 243 of FIG. 2E. At step 252, the server determines a display format for the additional details. At step 253, the server provides the additional details in the specified display format to the client computing device.

FIG. 3 depicts a data structure 300 in which data fields from an IT service are stored, for an application called Application Performance Management, consistent with FIG. 2B. The data structure represents data fields in periodically-updated data from an IT service, and how the data is stored in a manner which allows it to be used to create a web feed document. In one approach, a web feed document is a template document with placeholder elements such as a parameter name (PARNAME), a parameter label (PARLABEL), a display format (DISPLAYFORMAT), a severity (SEVERITY) and a user type (USERTYPE). For example, the periodically-updated data comprises parameters CPU5M, CPU1H and RESPT5M which are all stored under PARNAME since they are names of parameters. The corresponding parameter text labels are "% CPU usage (5 min.)," "% CPU usage (1 hour)" and "Response time (5 min.)." The text labels can be included in the periodically-updated data from the IT service, in one approach. In another approached, the text labels are stored at the feed server and associated with the parameters using the API. The periodically-updated data can include display formats associated with the parameters. In this example, the display formats are named DF_L1H (e.g., line display, one hour), DF_BC8H (e.g., bar chart, eight hours) and DF_LG1H (e.g., line graph, one hour). The periodically-updated data can include severity levels associated with the parameters, indicating whether a normal or abnormal condition exists based on a value of a parameter. In this example, the corresponding severities are named CPU5MSEV, CPU1HSEV and RESPT5MSEV. The corresponding user types are named CPU5MUT, CPU1HUT and RESPT5MUT.

In some cases, a parameter may have a name or a label, but not both.

The CPU usage can refer to the amount of the CPU capacity which is in use at a server of the IT service. The response time can be the time to invoke a software component, for instance, at a server of the IT service. Other examples of performance metrics for Application Performance Management can include, e.g., a number of errors and a number of invocations of a software component at a server of the IT service.

A timestamp named TS_A1, an application named APP1_ID, and an application text label of "Application Performance Management" are stored under placeholder elements named TIMENAME, APPNAME and APPLABEL, respectively.

Example entries, such as successive entries 301-304, include data values under the parameter names of TS_A1, CPU5M, CPU5MSEV, CPU5MUT, CPU1H, CPU1HSEV and CPU1HUT. For example, for the entry 301, TS_A1=12:00 GMT, CPU5M=12%, CPU5MSEV=0, CPU5MUT=1, CPU1H=11%, CPU1HSEV=0 and CPU1HUT=2. These entries include numerical data values, e.g., numbers. Entries could also include text strings. These are successive entries which indicate a time-varying performance of the IT service. Further, in this example, the entries are provided every five minutes. Note that the parameter CPU1H is provided only once an hour so data values are included for 12:00 GMT and 13:00 GMT at entries 301 and 304, respectively. Optionally, CPU1H is provided in each entry and represents a rolling one hour average. The most recent entry 304 may provide a current values of the parameters.

The database is continued at lines 301a-304a to further indicate that the example entries include data values under the parameter names RESPT5M, RESPT5MSEV and RESPT5MUT. For the entry 301, RESPT5M=2.2 sec., RESPT5MSEV=0 and RESPT5MUT+0.

The data structure 300 indicates that the plurality of data fields comprise a name and value of a first and second parameters, for at least one entry of the plurality of entries. For instance, a first parameter may be named CPU5M and have a value of 12 in entry 301. A second parameter may be named CPU1H and have a value of 11 in entry 301.

The parameter name or label are examples of identifiers of the parameter. A numerical data value or a severity level are examples of metrics for the parameter.

FIG. 4A depicts a data structure which associates a severity level with a label, consistent with FIG. 2B. The data structure indicates that the parameters corresponding to the placeholder element SEVERITY and having the value of 0, 1 or 2 correspond with a SEVERITYLABEL having a text label of "normal," "high" or "very high." Other severity levels could be provided as well such as low and very low. For instance, in the entry 301 of FIG. 3, CPU5MSEV, CPU1HSEV and RESPT5MSEV all equal zero, denoting a severity level of normal. Some parameters may not have an associated severity level. Here, the severity level is provided by the IT service. Optionally, it can be calculated by the feed data service API or other entity based on a comparison of a value of the parameter with one or more threshold levels.

FIG. 4B depicts a data structure 410 which associates a user type with a label, consistent with FIG. 2B. In some cases, a user type is associated with a parameter such that it is restrict the transmission of data from the parameter to users of one or more specified types. For instance, a user type of technician may receive data from parameters which represent the low level workings of an IT service while a user type of manager may receive data from parameters which provide a more summary view of the IT service. Data from other parameters may be provided to any user. The data structure indicates that the parameters corresponding to the placeholder element USERTYPE and having the value of 0, 1 or 2 correspond with a user type label UTLABEL having a text label of "any," "technician" or "manager." Other user types could be provided as well. In the entry 301 of FIG. 3, CPU5MUT, CPU1HUT and RESPT5MUT are set to 1, 2 and 0, respectively, indicating user types of "technician," "manager" and "any," respectively.

FIG. 4C depicts a data structure 420 for user credentials, consistent with FIG. 2D. Data values for a USERNAME, PASSWORD and USERTYPE are provided in response to inputs from a user, in one approach. For instance, the user can self-identify their type to receive data which is most appropriate for them. In another approach, an administrator or other person can set the USERTYPE. The credentials can be used in authenticating the user when additional details regarding an IT service are requested.

FIG. 5A depicts an example web feed document 500 for Application Performance Management, for a user type of technician, consistent with FIG. 3. In this example, one web feed document is created for one user type and one IT service, and the web feed document includes a separate item for each parameter of the IT service for which data is to be reported. The document can be in the RSS format, for instance, and comprises an extensible markup language (XML).

A web feed document includes tags which identify fields or elements in the document. For example, in region 501 of the document, the <rss> element identifies the document as being an RSS web feed document. The document can include one or more <channel> elements. A channel element is used to describe the RSS feed using three child element, namely a <title> element which defines a title of the channel, a <link> element which defines a hyperlink for the channel, and a <description>—element which describes the channel. Further, each <channel> element can have one or more <item> elements. In this example, each <item> element provides data regarding a parameter in the RSS feed, and has three child elements, similar to the channel. A <title> element of an item defines a title of the item, a <link> element of the item defines a hyperlink for the item, and a <description> element describes the item. For example, multiple items can be provided in a document, where each item provides data regarding a respective parameter of an IT service. In theory, one item could provide data regarding multiple parameters of an IT service. Another approach is to provide a separate web feed document for each parameter of an IT service.

A link can be a Uniform Resource Locator (URL), for instance. The text of the title and description can be hyperlinked to the associated URL. The region 501 of the document indicates that the title of the channel is "Data feed from Application Performance Management," the link is www.ITservices.com/APP1_ID, and the description is "This is a feed from APM for the technician." This link may provide information which is associated with the IT service application generally rather than with a specific parameter.

In this example, the parameters intended for use by the technician are CPU5M and RESPT5M but not CPU1H, so there are separate items for CPU5M and RESPT5M.

The region 502 is an item for the parameter named CPU5M. The code in this region may be executed using data fields of this parameter. The title includes the placeholder element VALUE(PARNAME), which represents a data value of the PARNAME parameter, e.g., 12. This is pseudo code which indicates that the value of PARNAME is to be determined and placed in the location of the placeholder element in the title. Various coding techniques can be used to do this. The title further includes the "@" symbol as fixed text. The title further includes the placeholder element of VALUE(TIMENAME), which represents a data value of the TIMENAME parameter, e.g., 06/07/14 12:00 GMT. The title further includes the placeholder element of SEVERITYLABEL, which can represent a text string, e.g., "normal." The link for this item is www.ITservices.com/APP1_ID/CPU5M, for instance. This is a link to web data which provides additional details regarding the parameter of the item such as a history of values of the parameter. The user can select the link to view the additional details, as discussed. Another option is for the link to use query terms to identify the application and/or the parameter referenced by the item. The predefined text description of the item is "This is the % CPU usage over5 minutes averaged." Generally, the description and/or title of an item can include text which identifies a parameter. This identification comprise predefined text. In other cases, a placeholder element in the title and/or description provides text which identifies a parameter.

The region 503 is an item for the parameter named RESPT5M. The code in this region may be executed using data fields of this parameter. The title has the same format and placeholder elements as in the previous item. The link for this item is www.ITservices.com/APP1_ID/RESPT5M, for instance. The predefined text description of the item is "This is the response time over 5 minutes averaged."

A region 504 of the document includes the closing tags for the channel and the RSS document.

The placeholders can be provided in at least one of the title and the description for an item.

The web feed document can be easily modified to add or remove items for parameters.

FIG. 5B depicts an example web feed document 510 consistent with FIG. 5A. This figure indicates how the web feed document of FIG. 5A is displayed to the user having the user type of technician on a client computing device. A region 511 includes text of the title and description of the channel, where the text is hyperlinked to the associated URL, as indicated by the underlining of the text. The description indicates that the feed is intended for use by a technician. Regions 512 and 513 include text of the title and description of the first and second items, respectively, of the document, where the text is hyperlinked to the associated URL, as indicated by the underlining of the text.

The message or document 510 is an example of, based on an identifier of a first parameter (e.g., CPU5M), preparing a first instance of a web feed document comprising a metric of the first parameter, for at least one entry of a plurality of entries in a database. It is also an example of the first instance of the web feed document comprising a metric of a second parameter (e.g., RESPT5M), for the at least one entry of the plurality of entries, based on the identifier of the second parameter.

FIG. 5C depicts an example generic web feed document 520. In this example, one web feed document is created which can be used for different IT services and their different parameters for which data is to be reported, as an alternative to the document of FIG. 5A. Further, the web feed document includes one item for a single parameter. A region 521 of the document includes a placeholder element named APPLA- BEL for the text label of the IT service application in the title of the channel. The title is "Data feed from APPLABEL." When the code is evaluated, APPLABEL is replaced by a text string (e.g., Application Performance Management or Service Desk). The associated link of the channel includes a placeholder element APPNAME (e.g., APP1_ID or APP2_ID) for the name of the IT service application. This link may provide information which is associated with the IT service application generally rather than with a specific parameter. The description of the channel also includes the placeholder element APPLABEL. These are example formats which can be modified.

A region 522 of the document includes the same title for the channel as in FIG. 5A. The link of the item includes the placeholder elements APPNAME LABEL and PARNAME so that the link references data for the named parameter of the named IT service application. This is a link to web data which provides additional details regarding the parameter associated with the item.

A region 523 of the document includes the closing tags for the channel and the RSS document.

FIG. 5D depicts the example web feed document of FIG. 5C as displayed by a feed reader. This figure indicates how the web feed document of FIG. 5C is displayed to the user having the user type of technician on a client computing device. A region 531 includes text of the title and description of the channel, where the text is hyperlinked to the associated URL, as indicated by the underlining of the text. The region 531 is similar to the region 511 except the description does not identify a user type. Region 532 includes text of the title and description of the item of the document, where the text is hyperlinked to the associated URL, as indicated by the underlining of the text.

FIG. 5E depicts alternative links for use in a web feed document, where the links specify a display format. As mentioned, a display format for parameter data can be specified by the IT service provided or other entity. This allows an IT service provider to control the display format, such as to provide different formats for different parameters and/or different user types, when additional details regarding a parameter are provided. One option is to include the display format in a URL in the web feed document so that the format is provided in a request to a server when a user selects the URL. This can be done in different ways. One approach is to provide the display format as part of a filename or directory of the URL. For example, the link 540 is www.ITservices.com/APP1_ID/CPU5M/DF L5M, where APP1_ID is an identifier of the IT service application, CPU5M is an identifier of a parameter of the service and DF_L5M is an identifier of the display format (e.g., provide a data list for the last 5 minutes of data). The link 541 includes a display format identifier of DF_L1H (e.g., provide a data list for the last 1 hour).

Another approach is to provide the display format in a query portion of the URL. For example, the link 542 is www.ITservices.com/?app=APPNAME& par=PARNAME&display=DISPLAYFORMAT, where three query terms are provided, following the "?" delimiter and separated by the "&" delimiter. A first query term is app=APPNAME, a second query term is par=PARNAME and a third query term is display=DISPLAYFORMAT.

Another approach is to not provide the display format for the additional details in the URL. In this approach, the web server which provides the additional detail can cross reference information such as the application name or the parameter name to a display format.

FIG. 6A depicts an example web feed document for Application Performance Management, for a user type of manager, consistent with FIG. 3. This is a counterpart document of the document of FIG. 5A but is intended for the manager and not the technician, according to the user type. In a region 601 of the document, the title, link and description of the channel are provided. The description indicates that the document is for a manager. The region 602 includes an item for the parameter CPU1H. A title, link and description are provided for the parameter, analogous to the region 502 and 506 of FIG. 5A. A region 603 of the document includes the closing tags for the channel and the RSS document.

FIG. 6B depicts an example web feed document 610 consistent with FIG. 6A. This figure indicates how the web feed document of FIG. 6A is displayed to the user having the user type of manager on a client computing device. A region 611 includes text of the title and description of the channel, where the text is hyperlinked to the associated URL, as indicated by the underlining of the text. The description indicates that the feed is intended for use by a manager. Region 612 includes text of the title and description of the item of the document, where the text is hyperlinked to the associated URL, as indicated by the underlining of the text.

The techniques provided herein can include a method wherein a plurality of data fields comprise an identifier and a metric of a first parameter, where the method further comprises: based on the identifier of the first parameter (e.g., CPU5M), preparing a first instance of web feed document (e.g., FIG. 5B) comprising a metric (e.g., VALUE(PARNAME) or SEVERITY LABEL) of the first parameter, for at least one entry of the plurality of entries.

The plurality of data fields can further comprise an identifier and a metric of a second parameter (e.g., CPU1H), where the method further comprises: based on the identifier of the second parameter, preparing a second instance of a web feed document (e.g., FIG. 6B) comprising the metric of the second parameter, for the at least one entry of the plurality of entries. In this case, different web feed documents are used for the different parameters of one IT service, based on user type.

Or, the plurality of data fields can comprise an identifier and a metric of a second parameter (e.g., RESPT5M,) where, based on the identifier of the second parameter, the first instance of the web feed document (e.g., FIG. 5B) comprises the metric of the second parameter, for the at least one entry of the plurality of entries. In this case, a common web feed document is used for the different parameters. In this case, there is on user type.

FIG. 7A depicts a data structure 700 in which data fields from an IT service are stored, for an application called Service Desk, consistent with FIG. 2B. Generally, data from a parameter can be based on data from multiple subparameters. This helps the user understand what is happening with the IT service. For example, the subparameters can be different categories of data which make up an overall data value. One example is a parameter named SR10M which is a number of service requests on average over the last 10 minutes for the Service Desk application. This could be a number of service requests pending, for instance. The associated subparameters indicate different categories of service requests such as password reset requests, slow response complaints and all other reasons. Specifically, an additional placeholder element named SUBPARNAME is provided for the subparameters which are named PWRST, SLRSP and OTHER. The labels under PARLABEL are #service requests (10 min.), Password reset, Slow response and Other reasons.

The display formats are DF_BC1H (e.g., bar chart, one hour) for the parameter, and DF_PC (pie chart) for each of the subparameters. In this option, the display format is for one pie chart where data from each subparameter is used for a respective portion of the pie chart. See FIG. 8G for an example. The data from each subparameter could optionally be displayed in other ways.

The placeholder element for severity is SEVERITY and the corresponding data field is SR10MSEV. In this example, a severity level is provided for the parameter but not for the subparameters. Optionally, a severity level can be provided for one or more of the subparameters as well. The placeholder element of USERTYPE is provided for the data field of SR10MUT.

A timestamp named TS_A2, an application named APP2_ID, and an application text label of "Service Desk" are stored under placeholder elements named TIMENAME, APPNAME and APPLABEL, respectively. As mentioned, the placeholder elements can be commonly used for multiple IT services.

Example entries, such as an entries 701-704, include data values under the parameter names of TS_A2, SR10M, SR10MSEV, SR10MUT, PWRST, SLRSP and OTHER. For example, for the entry 701, TS_A2=12:00 GMT, SR10M=102 requests, SR10MSEV=0 (normal), SR10MUT=0 (any user), PWRST=42 requests, SLRSP=13 requests and OTHER=47 requests (note that 102=42+13+47). SR10M=153 requests in another example entry 703. This is a relatively high level, above a specified threshold such as 125 requests, so that SR10MSEV is set to 1, indicating a high severity level.

FIG. 7B depicts an example web feed document 710 for Service Desk, consistent with FIG. 7A. The document includes a region 711 which is analogous to the regions 501, 521 and 601, discussed previously. In this case, a separate document is provided for the Service Desk application and for the SR10M parameter. The region 712 is analogous to the regions 502, 503 and 602, discussed previously. A region 713 of the document includes the closing tags for the channel and the RSS document.

FIG. 7C depicts an example web feed document 720 consistent with FIG. 7B. This figure indicates how the web feed document of FIG. 7B is displayed to a user on a client computing device. A region 721 includes text of the title and description of the channel, where the text is hyperlinked to the associated URL, as indicated by the underlining of the text. Region 722 includes text of the title and description of the item of the document, where the text is hyperlinked to the associated URL, as indicated by the underlining of the text.

FIG. 7D depicts alternative links for use in a web feed document, where the links specify subparameters of a parameter. In the link 730, the URL includes a portion www.ITservices.com/ServiceDesk/SR10M which indicates that it is for the parameter SR10M. The URL also includes query terms for three subparameters, namely PWRST, SLRSP and OTHER. In this manner, when the link is selected, it provide information to a web server to inform it that data for a detailed display should be provided for the identified parameter and its subparameters. Optionally, the URL can include the parameter but not the subparameters, and the web server can cross-reference the parameter to the associated subparameters.

The link 731 is generic to any application, parameter and subparameter, as indicated by the query terms of APPNAME, PARNAME, SUBPARNAME1, SUBPARNAME2 and SUBPARNAME3.

Figure 8B:
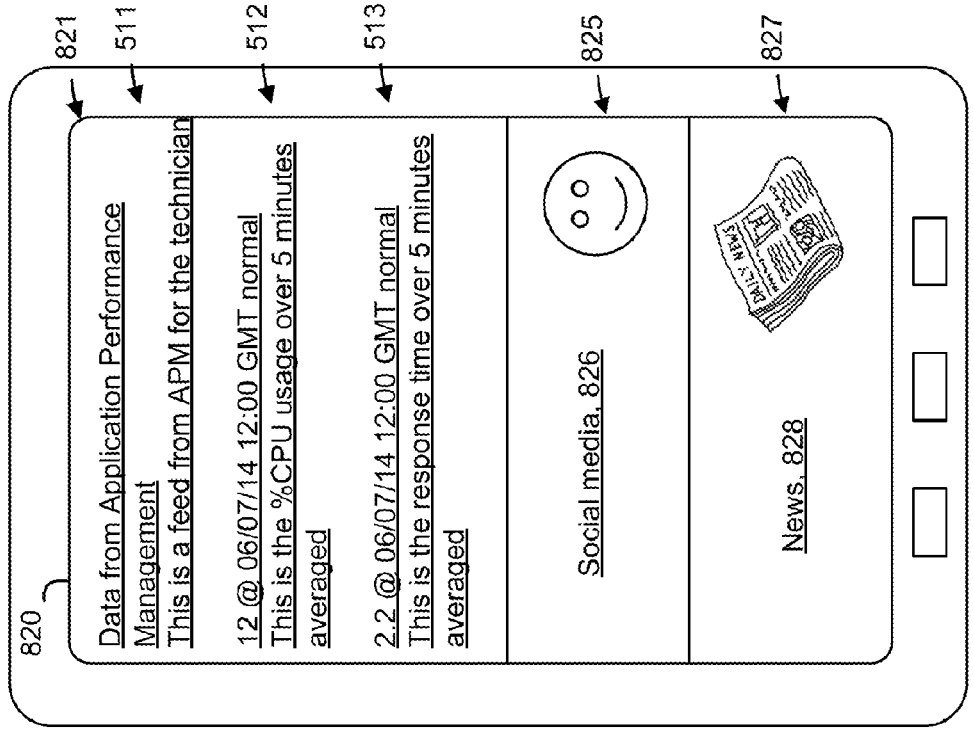
FIG. 8B depicts an example client computing device in which a user interface 820 provides the example web feed document of FIG. 5B in a social-network aggregation, magazine-format application software.
Figure 8A:
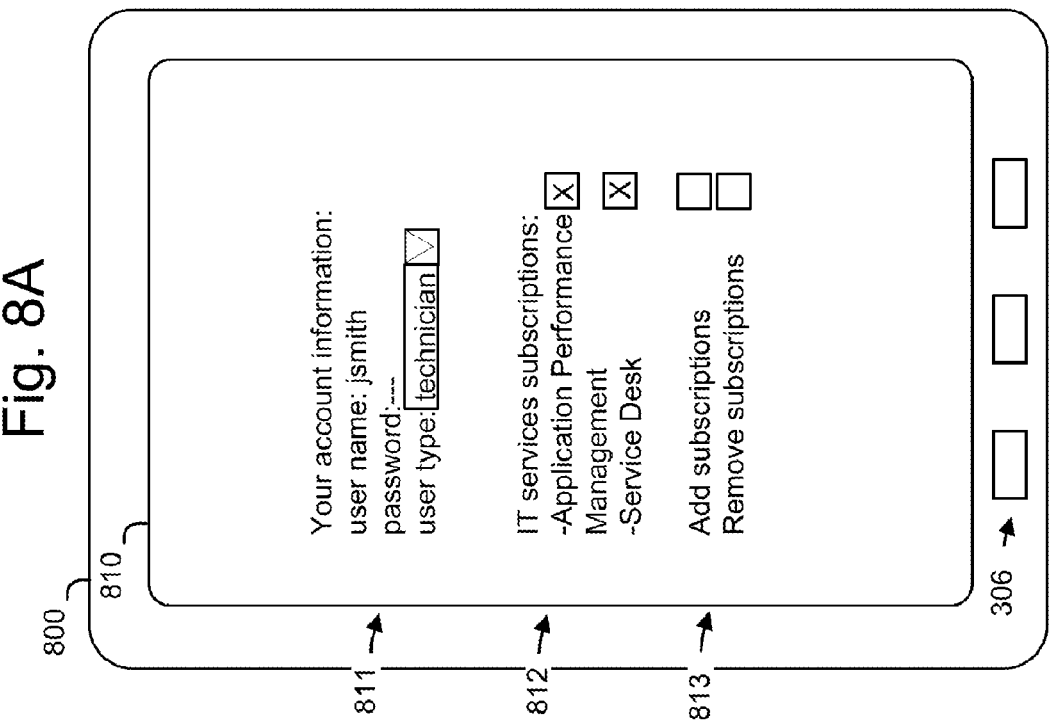
FIG. 8A depicts an example client computing device 800 in which a user interface 810 is used for a subscription process consistent with FIG. 2D.

FIG. 8A depicts an example client computing device 800 in which a user interface 810 is used for a subscription process consistent with FIG. 2D. The device is in the form of a tablet or smart phone, for instance. The UI is provided on a touch-screen display that responds to touch commands made by one or more fingers of a user. The client computing device can include buttons 306 or other controls for interacting with the UI.

A region 811 allows the user to enter account information such as a user name and password and to select the user type from a drop down menu of available user types. A region 812 indicates that the user has selected to subscribe to the IT services named Application Performance Management and Service Desk by selecting check boxes. In one approach, the available IT services are automatically listed based on the user type, or a list of all IT services can be provided. A region 813 allows the user to confirm that they want to add or remove a subscription. Optionally, the UI also allows the user to subscribe to selected parameters of an IT service.

FIG. 8B depicts an example client computing device in which a user interface 820 provides the example web feed document 510 of FIG. 5B in a social-network aggregation, magazine-format application software. The software provides multiple regions where each region provides information from a different application. For example, the region 821 is used for web feed documents. A region 825 is used for a social media application. A link 826 associated with the text "Social media" can be selected by the user to access the application. A region 827 is used for a news application. A link 828 associated with the text "News" can be selected by the user to access the application. Various other formats are possible. Examples of software which can provide the UI are FLIPBOARD®, LINKEDIN PULSE® and GOOGLE CURRENTS®.

Alternatively, the UI can be provided as a standalone application. Further, the UI can be provided as a web browser application or a native application of the client computing device.

Figure 8D:
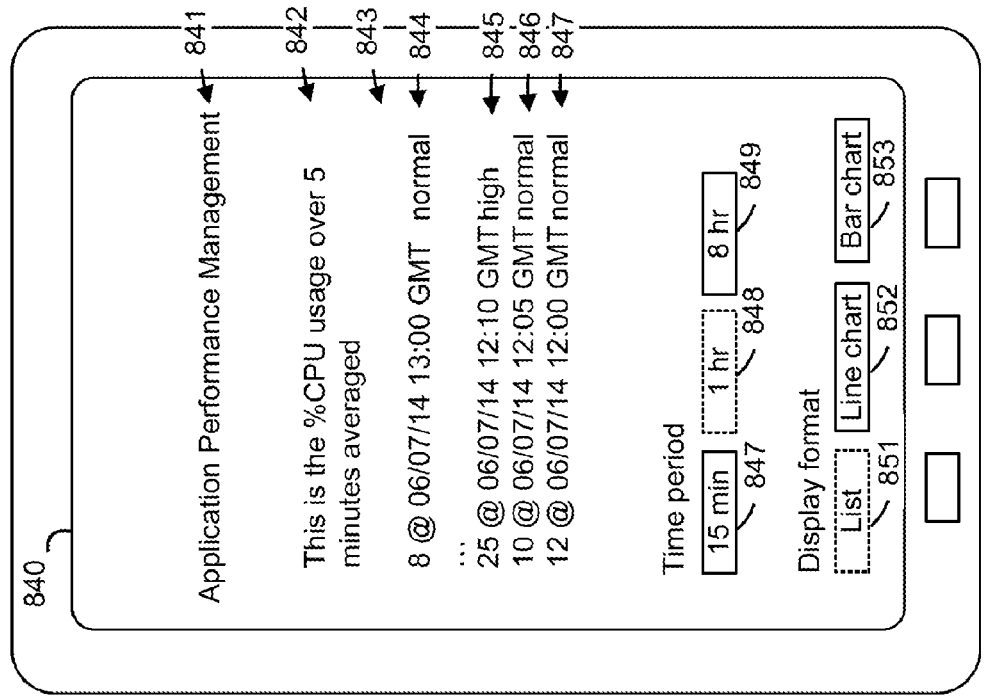
FIG. 8D depicts an example client computing device in which a user interface 840 provides further details based on a user selection of the item 823 of FIG. 8B or item 832 of FIG. 8C in a list format, as an example of FIGS. 2E and 2F.
Figure 8C:
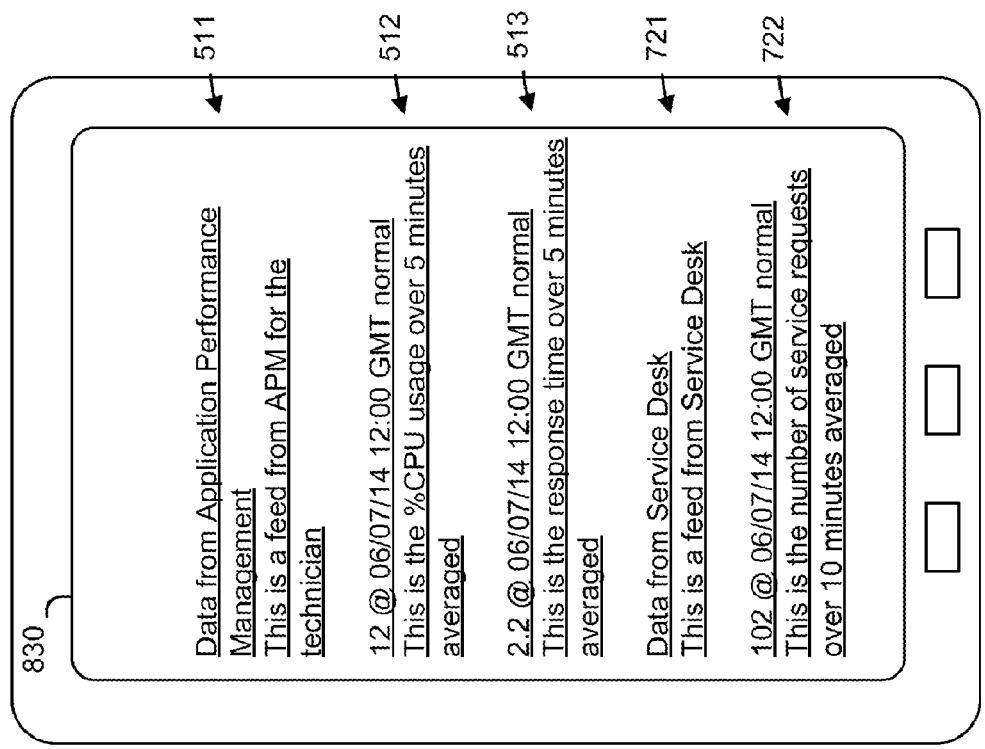
FIG. 8C depicts an example client computing device in which a user interface 830 displays the example web feed documents from two different applications (from FIG. 5B and FIG. 7C).

FIG. 8C depicts an example client computing device in which a user interface 830 displays the example web feed documents from two different applications (from FIG. 5B and FIG. 7C). In the UI, the region 511 includes text of the title and description of the channel for the first IT service (Application Performance Management). The regions 512 and 513 provide the title and description for the two parameters of the first IT service (CPU5M and RESPT5M). The region 720 includes text of the title and description of the channel for the second IT service (Service Desk). The region 721 provides the title and description for the one parameter of the second IT service (SR10M).

FIG. 8D depicts an example client computing device in which a user interface 840 provides further details in a list format based on a user selection of the hyperlinked text 512 of FIG. 8B or 8C, as an example of FIGS. 2E and 2F. As mentioned, by selecting a hyperlink in a web feed document, a request can be sent from the client computing device to a web server (e.g., the feed server 105 or the web server 106) to provide additional details regarding an associated parameter or IT service. For example, the UI 840 may be provided in response to the user touching the hyperlinked text 512. The server can provide the additional details for display in a web browser or native application of the client computing device. Further, the display format of the data can be specified by the request, in one approach. The display format can comprise, e.g., one of a bar chart, a line chart, a list, a pie chart and a flash card format.

The additional details can include metrics such as numerical data values or severity level for a parameter over a specified time period. The time period is part of the display format. This data is referred to as historical data because it includes a current entry 844 (the most recent entry) and past entries 845-847. The display format here is a list 843 such that each entry within the last one hour is displayed. Since the entries are provided every five minutes in this example, there are thirteen entries displayed. The UI may allow scrolling to view the list. The most recent entry may be displayed first, e.g., at the time of 13:00 GMT, while the least recent entry is displayed last. A heading 841 identifies the IT service and a sub-heading 842 identifies the parameter for which the details are provided. In one approach, the list is provided by displaying the item titles over the last one hour. The sub-heading can be provided from the item description. In this example, the display entries 844-847 correspond to the data entries 304-301, respectively, of FIG. 3.

As mentioned, an authentication protocol can be established so that the additional details are only provided to authorized users. In one approach, the client computing device provides login credentials to the web server with the request for the additional details and the web server evaluates and verifies the credentials before returning the requested data.

The UI can include buttons which allow the user to change the time period of the data involved in the display. For example, the time period can be changed from the default value of 1 hour, represented by a button 848. The user may wish to zoom in on the current data by using a button 847 for a 15 minute time period, or the user may wish to obtain a more long term perspective by using a button 849 for an 8 hour period. The client computing device can submit an additional request to the web server if additional data is needed to provide the display, e.g., when a longer time period is requested.

The UI also includes a set of buttons which allow the user to change the display format, e.g., from the default list of button 851 to a line chart of button 852 or to a bar chart of button 853.

Figure 8E:
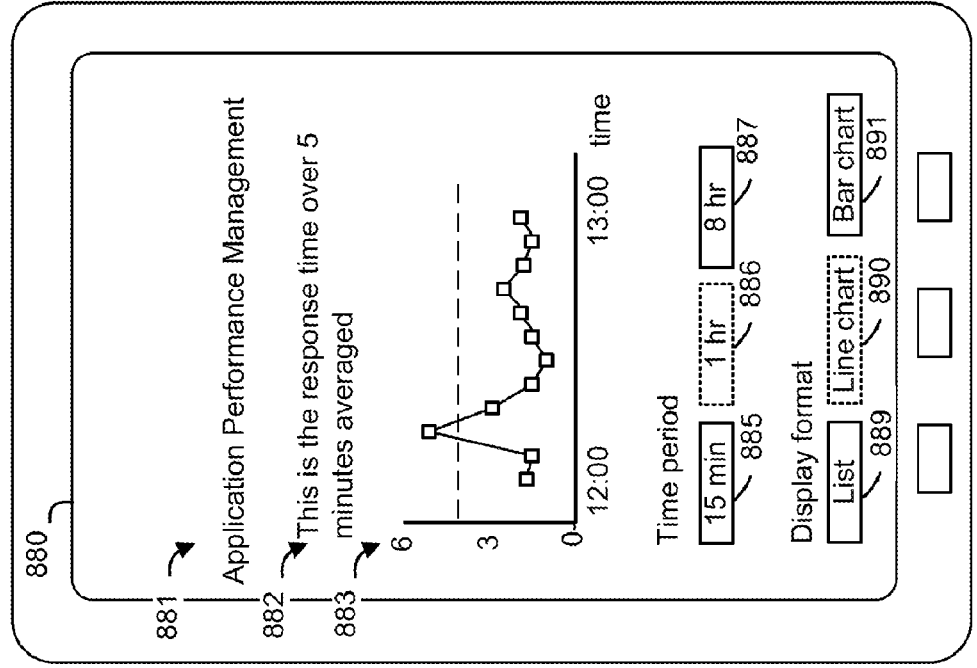
FIG. 8E depicts an example client computing device in which a user interface 860 provides further details based on a user selection of the item 612 of FIG. 6B in a bar chart format, as an example of FIGS. 2E and 2F.

FIG. 8E depicts an example client computing device in which a user interface 860 provides further details based on a user selection of the item 612 of FIG. 6B in a bar chart format, as an example of FIGS. 2E and 2F. The UI includes a heading 861, a sub-heading 862 and a bar chart 863 which provides the % CPU usage on the vertical axis and time on the horizontal axis. The default display format is for a bar chart over a time period of 8 hours as depicted by a button 866. Other display periods are 1 hour using a button 865 and 1 day using a button 867. A button 871 indicates that a bar chart is the default format. List formats and line chart formats are available using buttons 869 and 870, respectively.

Figure 8F:
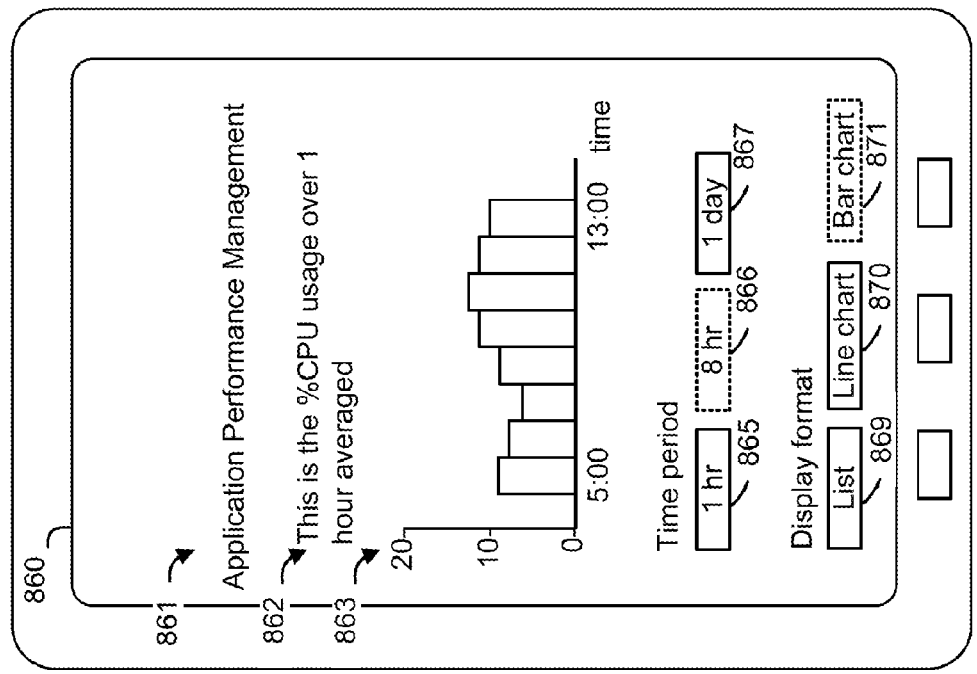
FIG. 8F depicts an example client computing device in which a user interface 880 provides further details based on a user selection of the item 824 of FIG. 8B or item 833 of FIG. 8C in a line chart format, as an example of FIGS. 2E and 2F.

FIG. 8F depicts an example client computing device in which a user interface 880 provides further details based on a user selection of the item 824 of FIG. 8B or item 833 of FIG. 8C in a line chart format, as an example of FIGS. 2E and 2F. The UI includes a heading 881, a sub-heading 882 and a line chart 883 which provides the response time on the vertical axis and time on the horizontal axis. The default display format is for a line chart over a time period of one hour as depicted by button 886. Other display periods are 15 minutes using a button 885 and 8 hours using a button 887. A button 890 indicates that a line chart is the default format. List formats and bar chart formats are available using buttons 889 and 891, respectively.

Figure 8G:
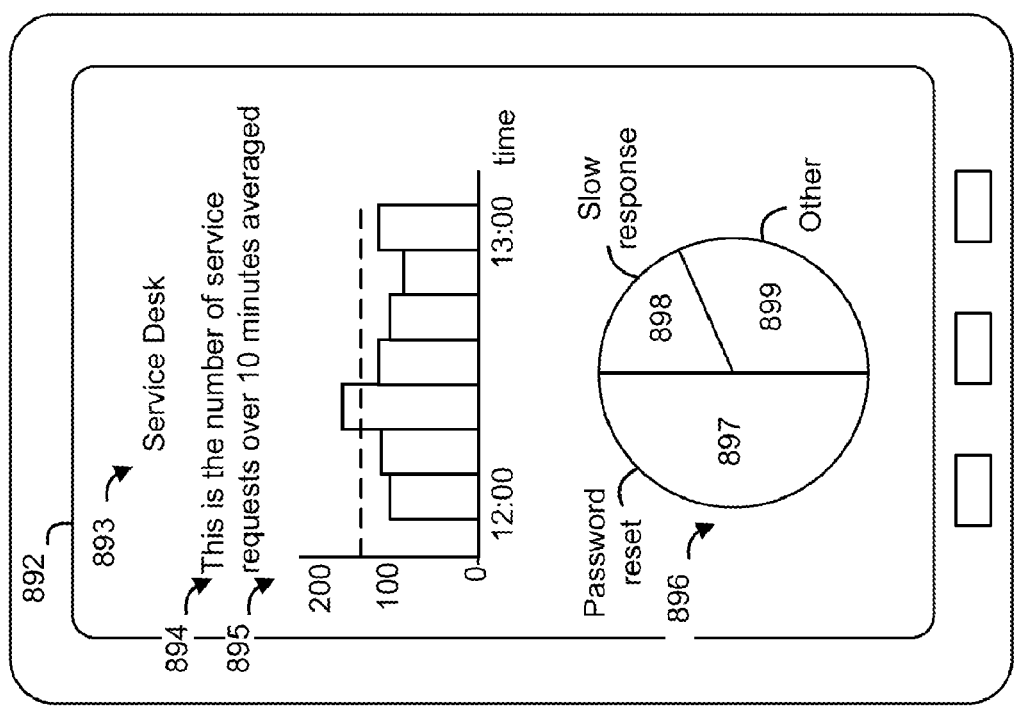
FIG. 8G depicts an example client computing device in which a user interface 892 provides further details regarding the item 732 of FIG. 8C using a bar chart format for a parameter, and using a pie chart format for the associated subparameters, as an example of FIGS. 2E and 2F.

FIG. 8G depicts an example client computing device in which a user interface 892 provides further details regarding the item 732 of FIG. 8C using a bar chart format for a parameter, and using a pie chart format for the associated subparameters, as an example of FIGS. 2E and 2F. The UI includes a heading 893, a sub-heading 894, a bar chart 895 which provides the number of service requests on the vertical axis and time on the horizontal axis, and a pie chart 896. The pie chart includes portions 897, 898 and 899 for the subparameters of Password reset, Slow response and Other. The relative sizes of the portions are based on the relative values of the subparameters. The bar chart is therefore provided for a parameter and the pie chart is provided for the subparameters. Other configurations are possible as well. For example, in place of the pie chart, the values of the subparameters could be indicated on the bars of the bar chart 895 by coloring portions of each bar based on the data values of the subparameters.

The functionality described herein may be implemented using hardware, software or a combination of both hardware and software. For software, one or more non-transitory, tangible processor readable storage devices or apparatuses having processor readable code embodied thereon for programming one or more processors may be used. The non-transitory, tangible processor readable storage devices can include computer readable media such as volatile and non-volatile media, removable and non-removable media.

The flowchart and block diagrams in the figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method, comprising:
monitoring an application to identify invocations of an instrumented component;
determining a response time of each invocation of the instrumented component;
determining an average of the response times in an X minute period;
determining a severity of the average of the response times in the X minutes period;
determining a rolling average of the response times in a Y minute period, where X and Y and numbers and Y>X;
determining a severity of the rolling average;
preparing a first web feed document for a first user type comprising, in a first <item> element, the average of the response times in the X minutes period and the severity of the average of the response times, the preparing the first web feed document comprises replacing placeholder elements in a <title> element of the first <item> element with the average of the response times and the severity of the average of the response times; and
preparing a second web feed document for a second user type comprising, in a second <item> element, the rolling average of the response times in the Y minute period and the severity of the rolling average, the preparing the second web feed document comprises replacing placeholder elements in a <title> element of the second <item> element with the rolling average and the severity of the rolling average.

2. The method of claim 1, wherein:
a display format and update period are specified in the first web feed document based on the first user type and in the second web feed document based on the second user type.

3. The method of claim 1, wherein:
the second web feed document does not indicate the average of the response times; and
the first web feed document does not indicate the rolling average.

4. The method of claim 1, wherein the severity of the average of the response times indicates a presence of an urgent problem, and the severity of the rolling average does not indicate a presence of the urgent problem, the method further comprising:
transmitting the first web feed document to a client computing device on an urgent basis in response to the severity of the average of the response times indicating the presence of the urgent problem; and
transmitting the second web feed document to a client computing device according to a schedule and not on an urgent basis in response to the severity of the rolling average not indicating the presence of the urgent problem.

5. The method of claim 1, further comprising:
providing a first URL in the first <item> element comprising a link to historical data of the average of the response times, the first URL comprises a parameter name of the average of the response times in at least one of a filename, directory or query term; and providing a second URL in the second <item> element comprising a link to historical data of the rolling average, the second URL comprises a parameter name of the rolling average in at least one of a filename, directory or query term.

6. The method of claim 5, further comprising:
providing an identifier of a first display format for the historical data of the average of the response times; and
providing an identifier of a second display format for the historical data of the rolling average, wherein the first display format is different than the second display format, the identifier of the first display format is provided in the first URL as at least one of a filename, directory or query term, and the identifier of the second display format is provided in the second URL as at least one of a filename, directory or query term.

7. The method of claim 6, wherein:
the identifier of the first display format also identifies the X minutes as a time period for displaying the historical data associated with the average of the response times; and
the identifier of the second display format also identifies the Y minutes as a time period for displaying the historical data associated with the rolling average.

8. The method of claim 1, wherein:
the first web feed document is prepared every X minutes.

9. A computer program product, comprising:
a non-transitory computer readable storage apparatus having computer readable program code embodied therewith, the computer readable program code comprising:
computer readable program code configured to receive entries from an information technology service running on a server, the entries indicate an amount of CPU capacity which is in use at the server over a first time period, a first severity level associated with the amount of CPU capacity which is in use at the server over the first time period, an amount of CPU capacity which is in use at the server over a second time period which is longer than the first time period, and a second severity level associated with the amount of CPU capacity which is in use at the server over the second time period;
computer readable program code configured to prepare a first web feed document from the entries and transmit the first web feed document to a client computing device associated with a first user type, the first web feed document identifying, in a <title> element, the amount of CPU capacity which is in use at the server over the first time period and the first severity level but not the amount of CPU capacity which is in use at the server over the second time and the second severity level; and
computer readable program code configured to prepare a second web feed document from the entries and transmit the second web feed document to a client computing device associated with a second user type, the second web feed document identifying, in a <title> element, the amount of CPU capacity which is in use at the server over the second time period and the second severity level but not the amount of CPU capacity which is in use at the server over the first time and the first severity level.

10. The computer program product of claim 9, further comprising:
computer readable program code configured to prepare an instance of the first web feed document every X minutes; and computer readable program code configured to prepare an instance of the second web feed document every Y>X minutes.

11. The computer program product of claim 9, wherein:
the first severity level transitions between not indicating an urgent problem with the amount of CPU capacity which is in use at the server over the first time period, and indicating the urgent problem with the amount of CPU capacity which is in use at the server over the first time period, while the second severity level continuously does not indicate the urgent problem with the amount of CPU capacity which is in use at the server over the second time period.

12. The computer program product of claim 9, wherein:
the first severity level indicates a presence of an urgent problem with the amount of CPU capacity which is in use at the server over the first time period;
the second severity level indicates no urgent problem with the amount of CPU capacity which is in use at the server over the second time period; and
the second period includes the first period.

13. A computer program product, comprising:
a non-transitory computer readable storage apparatus having computer readable program code embodied therewith, the computer readable program code comprising:
computer readable program code configured to monitor an application to identify invocations of an instrumented component;
computer readable program code configured to determine a response time of each invocation of the instrumented component;
computer readable program code configured to determine an average of the response times in an X minute period;
computer readable program code configured to determine a severity of the average of the response times in the X minutes period;
computer readable program code configured to determine a rolling average of the response times in a Y minute period, where X and Y and numbers and Y>X;
computer readable program code configured to determine a severity of the rolling average;
computer readable program code configured to prepare a first web feed document for a first user type comprising, in a first <item> element, the average of the response times in the X minutes period and the severity of the average of the response times, the preparing the first web feed document comprises replacing placeholder elements in a <title> element of the first <item> element with the average of the response times and the severity of the average of the response times; and
computer readable program code configured to prepare a second web feed document for a second user type comprising, in a second <item> element, the rolling average of the response times in the Y minute period and the severity of the rolling average, the preparing the second web feed document comprises replacing placeholder elements in a <title> element of the second <item> element with the rolling average and the severity of the rolling average.

\* \* \* \* \*